United States Patent
Hioda (10) Patent No.: US 10,773,680 B2
(45) Date of Patent: Sep. 15, 2020

(54) FRONT PASSENGER SEAT AIRBAG OSCILLATION REDUCING STRUCTURE

(71) Applicant: TOYOTA JIDOSHA KABUSHIKI KAISHA, Toyota-shi, Aichi-ken (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 16/238,114

(22) Filed: Jan. 2, 2019

(65) Prior Publication Data
US 2019/0256035 A1 Aug. 22, 2019

(30) Foreign Application Priority Data
Feb. 19, 2018 (JP) .................... 2018-027369

(51) Int. Cl.
*B60R 21/2334* (2011.01)
*B60R 21/205* (2011.01)

(52) U.S. Cl.
CPC ........ *B60R 21/2334* (2013.01); *B60R 21/205* (2013.01)

(58) Field of Classification Search
CPC . B60R 21/2334; B60R 21/205; B60R 21/215; B60R 2021/161; B60R 2021/23386; B60R 2021/0048; B60R 21/2338; B60R 21/231
See application file for complete search history.

(56) References Cited

U.S. PATENT DOCUMENTS

| | | | |
|---|---|---|---|
| 5,018,761 A | 5/1991 | Henseler | |
| 6,971,670 B1 * | 12/2005 | Eriksson | B60R 21/231 280/739 |
| 2010/0314859 A1 * | 12/2010 | Tomitaka | B60R 21/232 280/730.2 |
| 2011/0272928 A1 * | 11/2011 | Czach | B60R 21/232 280/730.2 |
| 2015/0091278 A1 * | 4/2015 | Yasuoka | B60R 21/2334 280/729 |
| 2016/0159312 A1 * | 6/2016 | Sato | B60R 21/233 280/729 |
| 2018/0297548 A1 * | 10/2018 | Abramoski | B60R 21/233 |
| 2020/0001817 A1 * | 1/2020 | Takeshita | B60R 21/205 |
| 2020/0101929 A1 * | 4/2020 | Albiez | D03D 1/02 |
| 2020/0108792 A1 * | 4/2020 | Ohno | B60R 21/232 |

FOREIGN PATENT DOCUMENTS

| | | |
|---|---|---|
| JP | H03-010947 A | 1/1991 |
| JP | H06-278559 A | 10/1994 |
| JP | 2009-096254 A | 5/2009 |
| JP | 2017-065395 A | 4/2017 |

* cited by examiner

Primary Examiner — Darlene P Condra
(74) Attorney, Agent, or Firm — Oliff PLC (57) ABSTRACT

An oscillation reducing structure for a front passenger seat airbag includes a front passenger seat airbag equipped with a center bag and a friction imparting device. When inflated and deployed, the front passenger seat airbag contacts with a front windshield glass in a first area, and contacts with an instrument panel in a second area. The friction imparting device makes at least one of a coefficient of frictions of the first area and the second area greater than that of other areas of the front passenger seat airbag. The friction imparting device is formed such that a coefficient of friction thereof in a vehicle width direction is greater than in a vehicle front-rear direction.

11 Claims, 7 Drawing Sheets

FRONT PASSENGER SEAT AIRBAG OSCILLATION REDUCING STRUCTURE

CROSS-REFERENCE TO RELATED APPLICATION

This application is based on and claims priority under 35 USC 119 from Japanese Patent Application No. 2018-027369 filed on Feb. 19, 2018, the disclosure of which is incorporated by reference herein.

BACKGROUND

Technical Field

The present disclosure relates to an oscillation reducing structure for a front passenger seat airbag.

Related Art

Technology has been disclosed, for example, in Japanese Unexamined Patent Application (JP-A) No. H6-278559 in which, in a front passenger seat airbag that is inflated and deployed in the event of a vehicle frontal collision, the shape of a contact area thereof that comes into contact with the front windshield glass is formed so as to match the surface configuration of the contacted area of the front windshield glass, and a coefficient of friction of this contact area of the airbag is higher than a coefficient of friction of other areas thereof.

Furthermore, technology has also been disclosed, for example, in Japanese Unexamined Patent Application (JP-A) No. 2009-96254 in which a lower side portion of a front passenger seat airbag is coated with rubber, and when the lower side portion of the inflated and deployed front passenger seat airbag comes into contact with the instrument panel, this rubber performs the role of an anti-slip device (i.e., by increasing the coefficient of friction), and thereby prevents the airbag from moving towards the vehicle front side.

In the event of an oblique collision in which the vehicle collides with an object in a diagonally forward direction on the driver's seat side, a front passenger seat airbag equipped with a center bag, which is capable of reducing any rotational injury to the head portion of a vehicle occupant sitting in the front passenger seat that is propelled in this diagonally forward direction, has also been hitherto proposed. In this front passenger seat airbag equipped with a center bag, there is a need to stabilize the position contacted by the head portion of a vehicle occupant which is propelled in a diagonally forward direction during an oblique collision.

However, because this front passenger seat airbag equipped with a center bag has a left-right asymmetrical configuration, and acceleration force is applied to the vehicle in a vehicle width direction during an oblique collision, there is a possibility that this front passenger seat airbag equipped with a center bag will oscillate in the vehicle width direction when this airbag is being inflated and deployed. In other words, there is still room for improvement in stabilizing the position where a diagonally forward-moving head portion of a vehicle occupant comes into contact with this front passenger seat airbag equipped with a center bag.

SUMMARY

The present disclosure provides an oscillation reducing structure for a front passenger seat airbag that is capable of reducing oscillation in a vehicle width direction of a front passenger seat airbag equipped with a center bag when this airbag is being inflated and deployed.

In order to achieve the above-described object, an oscillation reducing structure for a front passenger seat airbag of a first aspect of the present disclosure is provided with a front passenger seat airbag that is equipped with a center bag, is provided in an instrument panel, and is inflated and deployed when supplied with gas from an inflator, and a friction imparting device that makes at least one of a coefficient of friction of a first area of the inflated and deployed front passenger seat airbag that comes into contact with a front windshield glass, or a coefficient of friction of a second area of this inflated and deployed front passenger seat airbag that comes into contact with an instrument panel, greater than a coefficient of friction of other areas of this front passenger seat airbag, wherein the friction imparting device is formed such that a coefficient of friction thereof in a vehicle width direction is greater than in a vehicle front-rear direction.

According to the first aspect, at least one of a coefficient of friction of a first area of the inflated and deployed front passenger seat airbag that comes into contact with a front windshield glass, or a coefficient of friction of a second area of this inflated and deployed front passenger seat airbag that comes into contact with an instrument panel is made greater by a friction imparting device than a coefficient of friction of other areas of this front passenger seat airbag. Additionally, this friction imparting device is formed such that a coefficient of friction thereof in a vehicle width direction is greater than in a vehicle front-rear direction. Accordingly, in the event of an oblique collision or the like, oscillation in the vehicle width direction is reduced in a front passenger seat airbag equipped with a center bag when this airbag is being inflated and deployed.

An oscillation reducing structure for a front passenger seat airbag of a second aspect is characterized in that, in the first aspect, the friction imparting device is created by providing a plurality of stitches that are sewn in the vehicle front-rear direction in a plurality of rows in the vehicle width direction.

According to the second aspect, the friction imparting device is formed by providing a plurality of stitches, which are sewn so as to extend in the vehicle front-rear direction, in a plurality of rows in the vehicle width direction. Accordingly, the friction imparting device can be formed easily.

An oscillation reducing structure for a front passenger seat airbag of a third aspect is characterized in that, in the first aspect, the friction imparting device is formed by sewn lines of a plurality of stitches that are sewn so as to extend in the vehicle front-rear direction in order to stitch together a plurality of airbag panels that are separated in the vehicle width direction.

According to the third aspect, the friction imparting device is formed by sewn lines of a plurality of stitches that are sewn so as to extend in the vehicle front-rear direction in order to stitch together a plurality of airbag panels that are formed as separate pieces in the vehicle width direction. Accordingly, no new steps are required in order to provide the friction imparting device, so that any increase in manufacturing costs is prevented.

An oscillation reducing structure for a front passenger seat airbag of a fourth aspect is characterized in that, in the first aspect, a pattern made up of a plurality of transparent dots whose longitudinal direction extends in the vehicle front-rear direction is provided in an area of the front windshield glass that is contacted by the first area.

According to the fourth aspect, a pattern made up of a plurality of transparent dots whose longitudinal direction extends in the vehicle front-rear direction is provided in an area of the front windshield glass that is contacted by the first area. Accordingly, oscillation in the vehicle width direction of the inflated and deployed front passenger seat airbag equipped with a center bag is further reduced.

An oscillation reducing structure for a front passenger seat airbag of a fifth aspect is characterized in that, in the first aspect, embossing that has regularity in the vehicle front-rear direction is formed in an area of the instrument panel that is contacted by the second area.

According to the fifth aspect, embossing that has regularity in the vehicle front-rear direction is formed in an area of the instrument panel that is contacted by the second area. Accordingly, oscillation in the vehicle width direction of the inflated and deployed front passenger seat airbag equipped with a center bag is further reduced.

An oscillation reducing structure for a front passenger seat airbag of a sixth aspect is characterized in that, in the first aspect, character lines whose longitudinal direction extends in the vehicle front-rear direction are formed in an area of the instrument panel that is contacted by the second area.

According to the sixth aspect, character lines whose longitudinal direction extends in the vehicle front-rear direction are formed in an area of the instrument panel that is contacted by the second area. Accordingly, oscillation in the vehicle width direction of an inflated and deployed front passenger seat airbag equipped with a center bag is further reduced.

An oscillation reducing structure for a front passenger seat airbag of a seventh aspect is characterized in that, in the first aspect, the friction imparting device is formed by a plurality of stitches that are sewn so as to extend in the vehicle front-rear direction and formed in a plurality of rows in the vehicle width direction in the first area, and by a sunshade pattern that is provided in an area of the front windshield glass that lies opposite the first area.

According to the seventh aspect, the friction imparting device is formed by a plurality of stitches of the front passenger seat airbag, and by a sunshade pattern in the front windshield glass. Accordingly, oscillation in the vehicle width direction of an inflated and deployed front passenger seat airbag equipped with a center bag is synergistically reduced by mutual interference between the plurality of stitches and the sunshade pattern.

An oscillation reducing structure for a front passenger seat airbag of an eighth aspect is characterized in that, in the first aspect, the friction imparting device is formed by sewn lines of a plurality of stitches that are sewn so as to extend in the vehicle front-rear direction in order to stitch together a plurality of airbag panels that are separated in the vehicle width direction in the first area, and by a sunshade pattern that is provided in an area of the front windshield glass that is opposite to the first area.

According to the eighth aspect, the friction imparting device is formed by sewn lines of a plurality of stitches of the front passenger seat airbag, and by a sunshade pattern of the front windshield glass. Accordingly, oscillation in the vehicle width direction of an inflated and deployed front passenger seat airbag equipped with a center bag is synergistically reduced by mutual interference between the plurality of stitches and the sunshade pattern.

According to the first aspect, when a front passenger seat airbag equipped with a center bag is inflated and deployed, oscillation in the vehicle width direction thereof can be reduced.

According to the second aspect, a friction imparting device can be easily formed.

According to the third aspect, no new steps are required in order to provide the friction imparting device, so that any increase in manufacturing costs can be prevented.

According to the fourth through sixth aspects, oscillation in the vehicle width direction of an inflated and deployed front passenger seat airbag equipped with a center bag can be further reduced.

According to the seventh and eighth aspects, oscillation in the vehicle width direction of an inflated and deployed front passenger seat airbag equipped with a center bag can be synergistically reduced.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment according to the present disclosure will be described in detail based on the drawings. Note that an arrow UP, an arrow FR, and an arrow RH that are shown in the appropriate drawings respectively indicate a vehicle upward direction, a vehicle forward direction, and a vehicle right-hand side direction. Accordingly, if up-down, front-rear, or left-right directions are used in the following description, then, unless specifically stated otherwise, these refer respectively to the up-down directions of the vehicle, the front-rear directions of the vehicle, and the left-right directions of the vehicle (i.e., the vehicle width direction).

A vehicle 12 (see FIG. 1) provided with an oscillation reducing structure 10 of a front passenger seat airbag 20 equipped with a center bag 22 (hereinafter, this is referred to simply as a front passenger seat airbag 20) according to the present exemplary embodiment is what is known as a left-hand drive vehicle in which a front passenger seat is on the right side. Accordingly, as is shown in FIG. 2, the center bag 22 is provided integrally with a left side of the front passenger seat airbag 20 so as to protrude towards a vehicle cabin side.

In the event of an oblique collision in which the vehicle 12 collides with an object in a diagonally forward direction on the driver's seat side, a head portion H of a vehicle occupant P sitting in the front passenger seat that is propelled in this diagonally forward direction presses against a slit portion 21, which is a base portion of the center bag 22 provided in the front passenger seat airbag 20. As a result, rotational injury to the head portion H of the vehicle occupant P is reduced.

Figure 1:
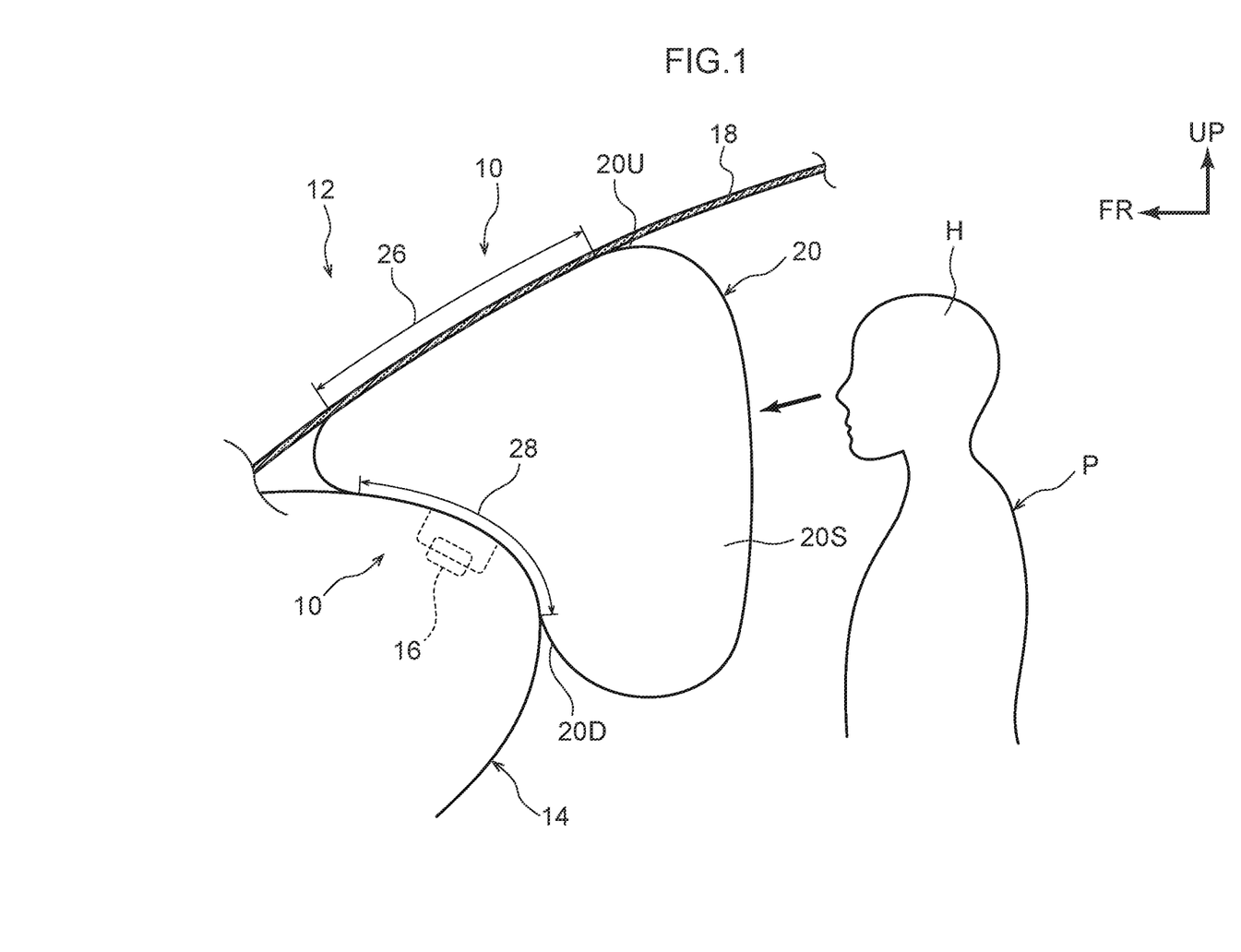
FIG. 1 is a side view showing a positional relationship between an inflated and deployed front passenger seat airbag and a front windshield glass and instrument panel according to the present exemplary embodiment.

The front passenger seat airbag 20 is provided in a folded state on an inner side (i.e., on a vehicle front side) of an instrument panel 14 (see FIG. 1). When a sensor (not shown in the drawings) detects that the vehicle 12 has been in a collision, the front passenger seat airbag 20 is supplied with gas from an inflator 16 (see FIG. 1) under the control of a control unit (not shown in the drawings). As a result, as is shown in FIG. 1, the front passenger seat airbag 20 is inflated and deployed.

Figure 2:
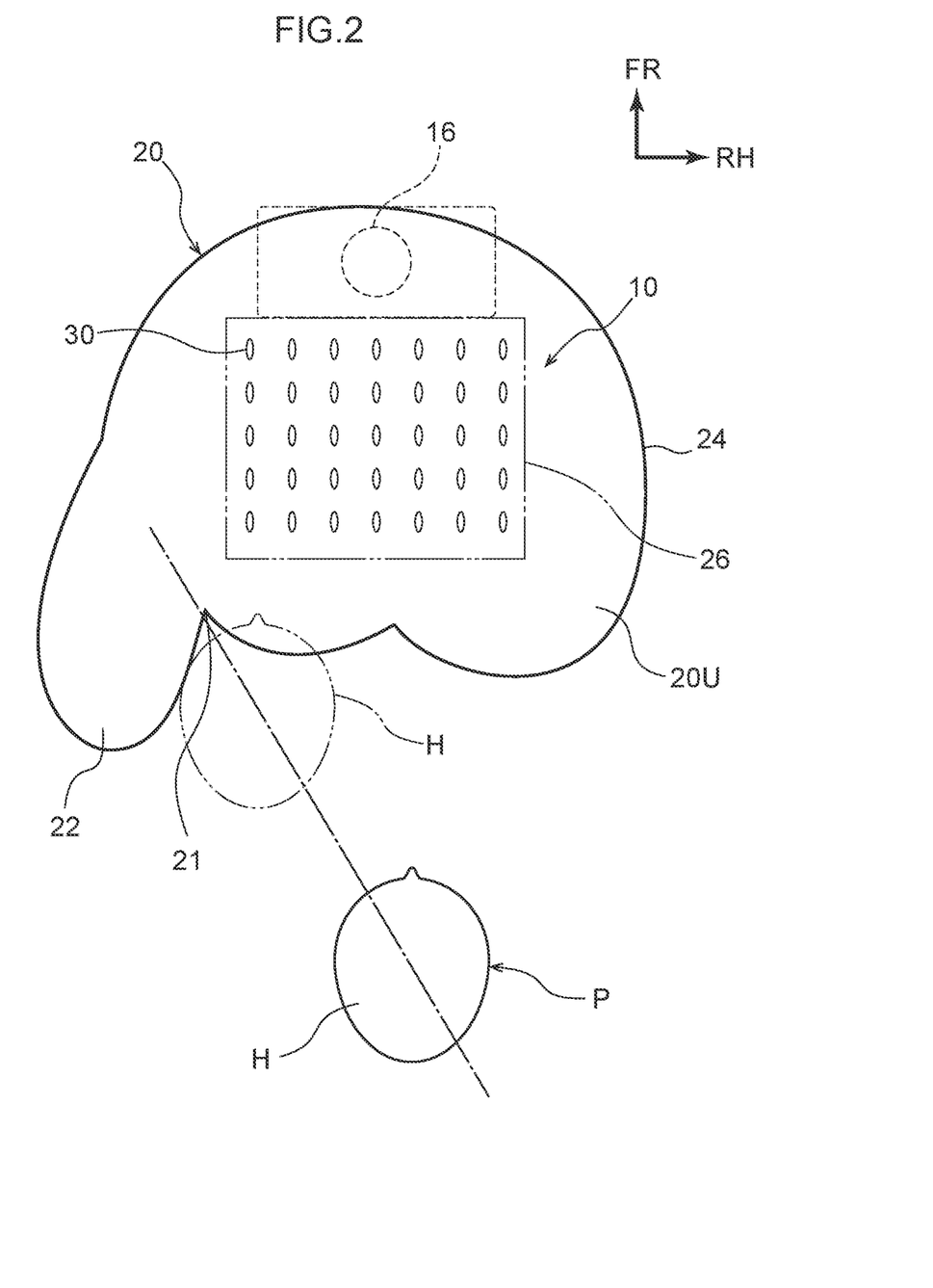
FIG. 2 is a plan view showing an inflated and deployed front passenger seat airbag according to the present exemplary embodiment.
Figure 3:
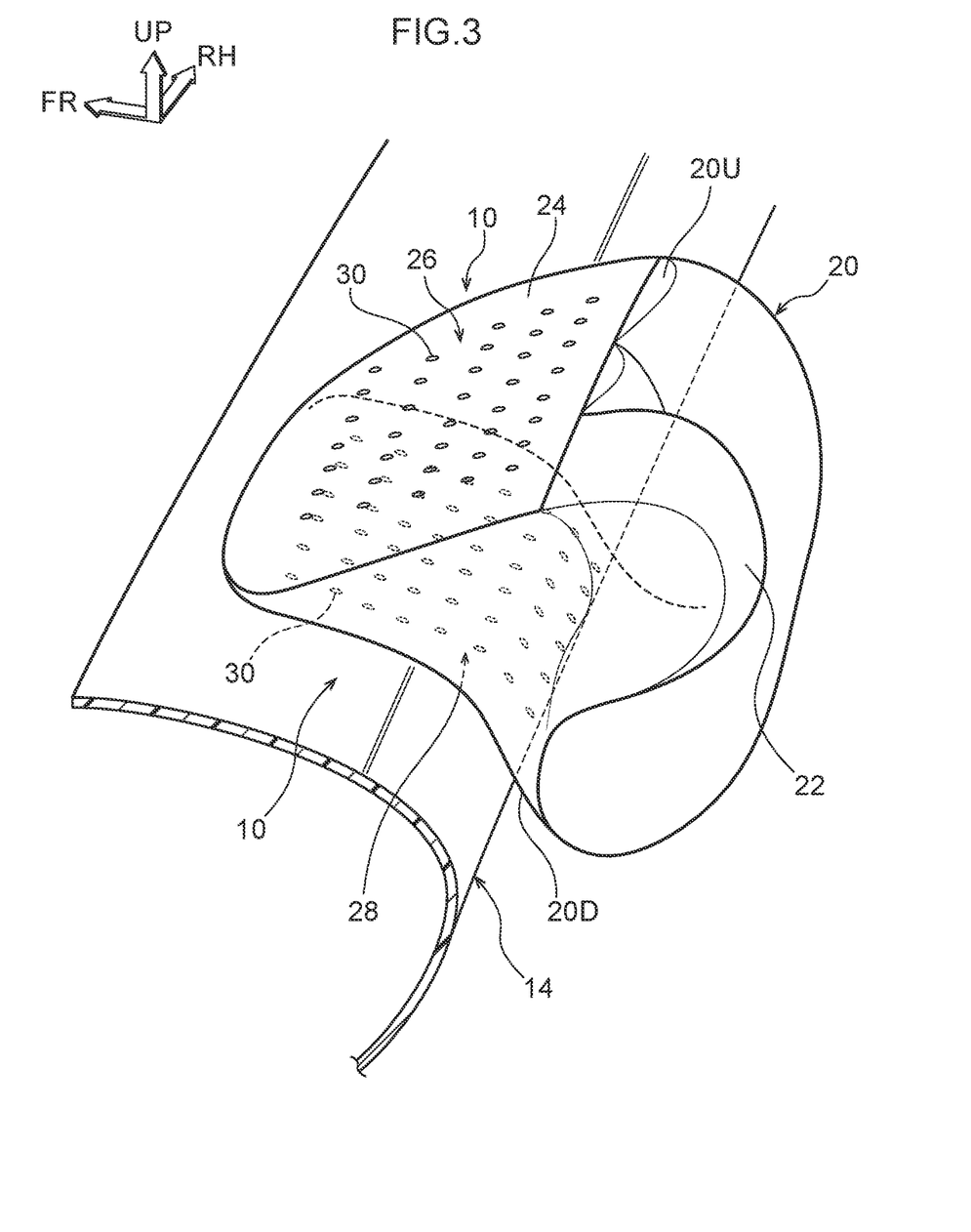
FIG. 3 is a perspective view showing an inflated and deployed front passenger seat airbag according to the present exemplary embodiment together with an instrument panel.

As is shown in FIG. 1 through FIG. 3, a portion of an upper surface 20U of the inflated and deployed front passenger seat airbag 20 is formed as a first area 26 which comes into contact with a front windshield glass (hereinafter, referred to simply as a front glass) 18. Additionally, a portion of a lower surface 20D of the inflated and deployed front passenger seat airbag 20 is formed as a second area 28 which comes into contact with an outer surface (i.e., a surface facing towards the vehicle cabin) of the instrument panel 14.

A plurality of stitches 30 are provided respectively as examples of friction imparting devices in the first area 26 and the second area 28. The stitches 30 are empty stitches that do not sew anything onto an airbag panel 24 forming part of the front passenger seat airbag 20, and are stitched in regular rows in the vehicle front-rear direction.

More specifically, a plurality of (for example, five) stitches 30, which individually are formed such that a longitudinal direction thereof extends in the vehicle front-rear direction, are formed in one row running in the vehicle front-rear direction. Additionally, a plurality of (seven or eight) rows of the stitches 30, with each row being formed by a plurality of stitches 30 running in the vehicle front-rear direction, are formed in parallel with each other in the vehicle width direction. In other words, the stitches 30 in the first area 26 and in the second area 28 are each formed in a matrix configuration.

As a result, a structure is created in which coefficients of friction of the first area 26 and the second area 28 are greater than coefficients of friction of other areas, for example, of a side surface 20S (see FIG. 1) of the front passenger seat airbag 20. Accordingly, a structure is employed in which the coefficients of friction in the vehicle width direction (i.e., drag against an inertial force acting in the vehicle width direction) in the first area 26 and the second area 28 are greater than in the vehicle front-rear direction.

Actions of the oscillation reducing structure 10 for the front passenger seat airbag 20 according to the present exemplary embodiment having the above-described structure will now be described.

When, for example, a sensor (not shown in the drawings) detects that the vehicle 12 has been in an oblique collision on the driver's seat side, a control unit (not shown in the drawings) causes the inflator 16 to operate so that gas is supplied instantly to an interior of the front passenger seat airbag 20. As a result, as is shown in FIG. 1 through FIG. 3, the front passenger seat airbag 20 is inflated and deployed.

Here, the front passenger seat airbag 20 is equipped with the center bag 22. Because of this, the front passenger seat airbag 20 has a left-right asymmetrical configuration. Moreover, acceleration force in the vehicle width direction is applied to the vehicle 12 during an oblique collision. Accordingly, there is a possibility that this front passenger seat airbag 20 will oscillate in the vehicle width direction when this front passenger seat airbag 20 is inflated and deployed.

However, in the oscillation reducing structure 10 according to the present exemplary embodiment, the stitches 30, whose longitudinal directions extend respectively in the vehicle front-rear direction, are formed in a matrix configuration in the first area 26 of the front passenger seat airbag 20 that comes into contact with the inner surface of the front glass 18, and in the second area 28 thereof that comes into contact with the outer surface of the instrument panel 14.

Accordingly, the coefficient of friction of the first area 26 against the inner surface of the front glass 18, and the coefficient of friction of the second area 28 against the outer surface of the instrument panel 14 are greater than the coefficient of friction of other areas (for example, the side surface 20A) of the front passenger seat airbag 20. Additionally, the coefficient of friction in the vehicle width direction is greater than in the vehicle front-rear direction in both the first area 26 and the second area 28.

Accordingly, when the front passenger seat airbag 20 is inflating and deploying during an oblique collision or the like, it is possible to effectively reduce any oscillation in the vehicle width direction of this front passenger seat airbag 20. As a consequence, the position of the center bag 22 in the front passenger seat airbag 20 can be stabilized, and the head portion H of the vehicle occupant P sitting in the front passenger seat who is propelled diagonally forward is able to penetrate the slit portion 21 in the appropriate way. In other words, rotational injury to the head portion H of the vehicle occupant P is appropriately reduced.

Figure 4:
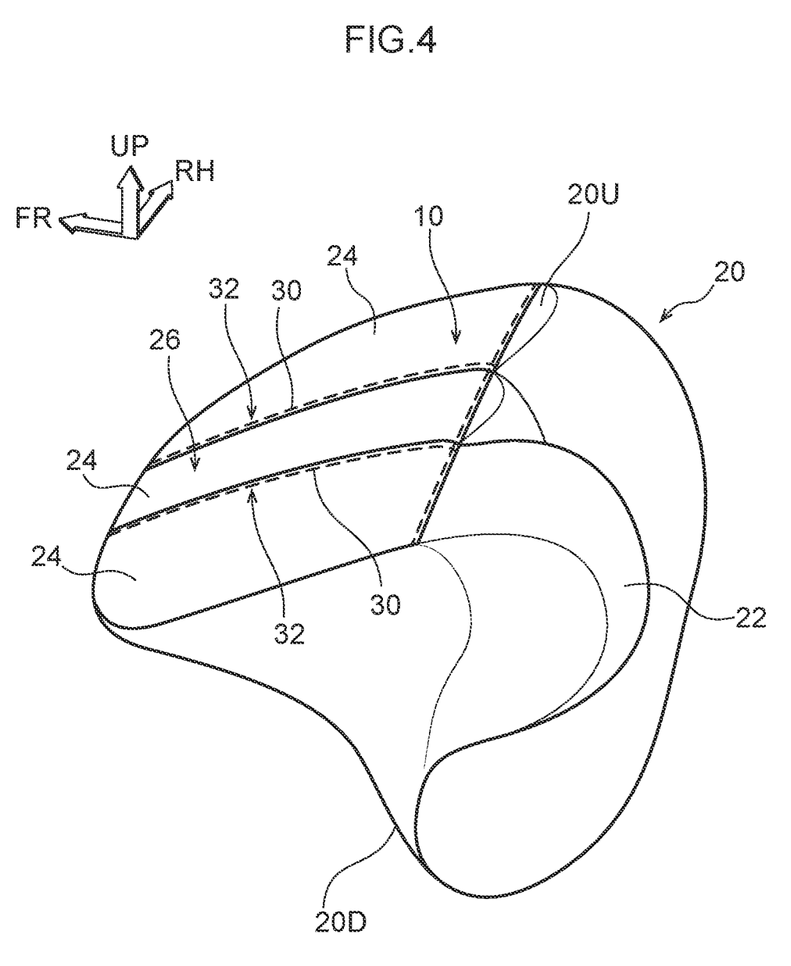
FIG. 4 is a perspective view showing an inflated and deployed front passenger seat airbag according to a variant example of the present exemplary embodiment.

Note that, as is shown in FIG. 4, the friction imparting device may also be formed by sewn lines 32 of a plurality of the stitches 30 that are sewn so as to extend in the vehicle front-rear direction in order to stitch together a plurality of (for example, 3) airbag panels 24 that are formed as separate pieces in the vehicle width direction. In other words, it is also possible to employ a structure in which no other stitches 30 are provided apart from those in the plurality of sewn lines 32 that stitch together the plurality of airbag panels 24 that are formed as separate pieces in the vehicle width direction.

According to this structure, in a process to manufacture the front passenger seat airbag 20, because there is no need for a new step that provides the stitches 30 (i.e., empty stitches) which are serving as an example of a friction imparting device, any increase in manufacturing costs can be prevented. Note that the number of airbag panels 24 that are separately provided in the vehicle width direction is not limited to the three shown in the drawing. Additionally, only the sewn lines 32 in the first area 26 are shown in FIG. 4, and the sewn lines in the second area 28 have been omitted from the drawing.

Figure 5A:
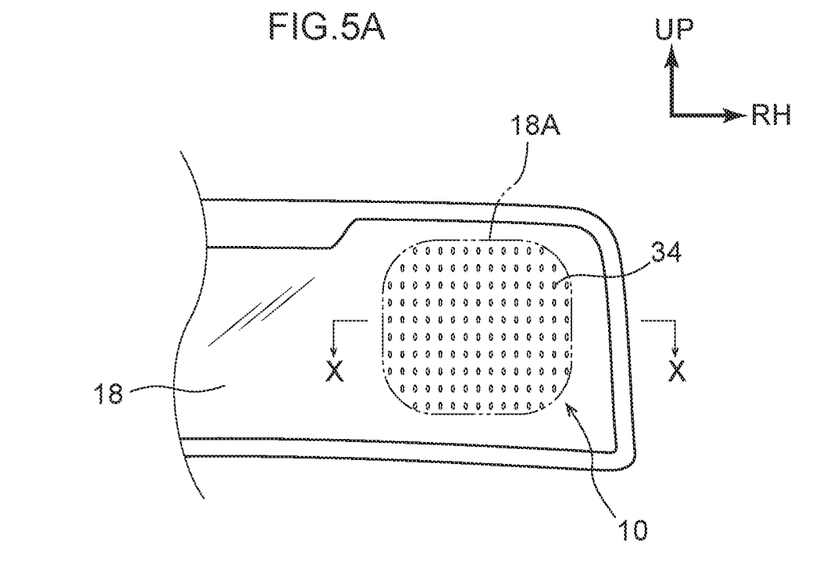
FIG. 5A is a front view showing a transparent dot pattern provided on a front windshield glass.
Figure 7A:
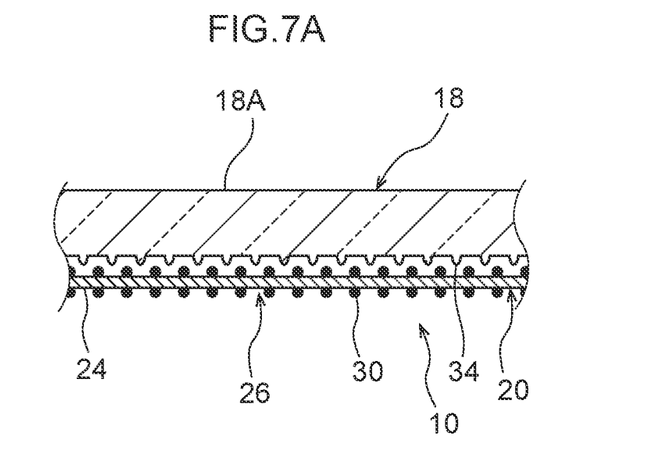
FIG. 7A is an enlarged cross-sectional view across a line X-X in FIG. 5A shown together with a front passenger seat airbag.

Moreover, as is shown in FIG. 5A and FIG. 7A, it is also possible for a pattern made up of a plurality of transparent dots 34 whose longitudinal direction extends in the vehicle front-rear direction to be provided in a matrix configuration in an area 18A of the front glass 18 that is contacted by the first area 26. This pattern of transparent dots 34 is a transparent version of a commonly known black dot pattern that serves as a sunshade provided in an upper portion of the front glass 18, and is preferably disposed such that the plurality of transparent dots 34 are located between the stitches 30 that are arranged in a plurality of rows lined up in the vehicle width direction (see FIG. 7A).

According to this structure, even if the upper surface 20U of the front passenger seat airbag 20 attempts to move in the vehicle width direction, the stitches 30 formed in the first area 26 and the pattern of transparent dots 34 provided on the front glass 18 mutually impede each other's movement in the vehicle width direction, so that any movement in the vehicle width direction of the front passenger seat airbag 20 is inhibited. Accordingly, it is possible to further reduce oscillation in the vehicle width direction of the inflated and deployed front passenger seat airbag 20.

Figure 5B:
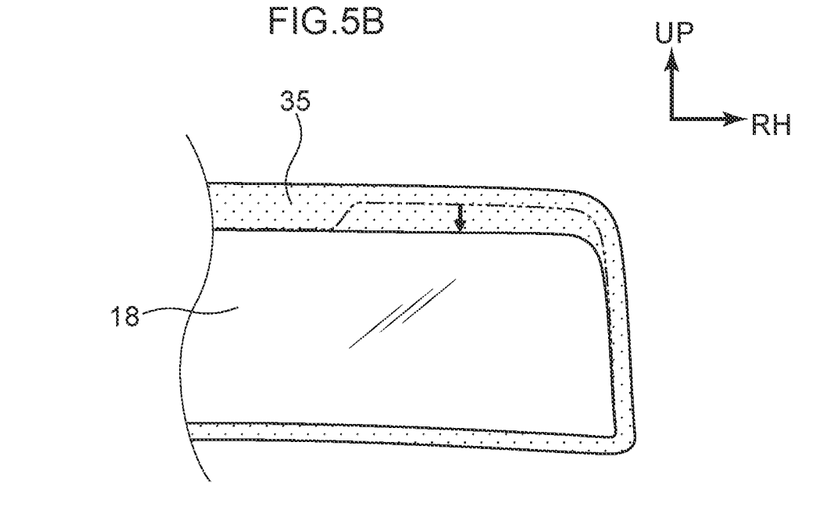
FIG. 5B is a front view showing a case in which a sunshade pattern on a front windshield glass is formed down to a predetermined lower position.

Note that there may be a concern that forward visibility in the vehicle 12 may be somewhat obstructed, however, as is shown in FIG. 5B, it is also possible to provide a sunshade pattern 35, which is a commonly known black or grey line pattern or dot pattern provided in the upper portion of the front glass 18, down to a predetermined lower position, such that the dots of this sunshade pattern are located between a portion of the plurality of stitches 30 formed in the first area 26 of the inflated and deployed front passenger seat airbag 20.

According to this structure, even if the upper surface 20U of the front passenger seat airbag 20 attempts to move in the vehicle width direction, a portion of the stitches 30 formed in the first area 26 and a portion of the sunshade pattern 35 provided on the front glass 18 mutually impede each other's movement, so that any movement in the vehicle width direction of the front passenger seat airbag 20 is inhibited.

Accordingly, it is possible to further reduce oscillation in the vehicle width direction of the inflated and deployed front passenger seat airbag 20. Note that the pattern of transparent dots 34 is not shown in FIG. 5B, however, if, as is described above, a portion of the sunshade pattern 35 is utilized, then the size of the area 18A where the pattern of transparent dots 34 is provided can be reduced.

Figure 6A:
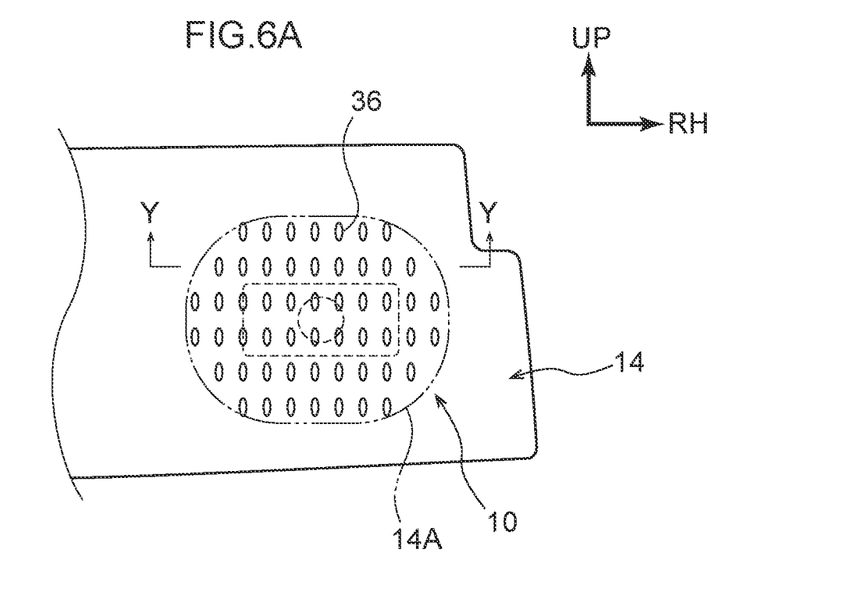
FIG. 6A is a front view showing embossing formed on an instrument panel.
Figure 7B:
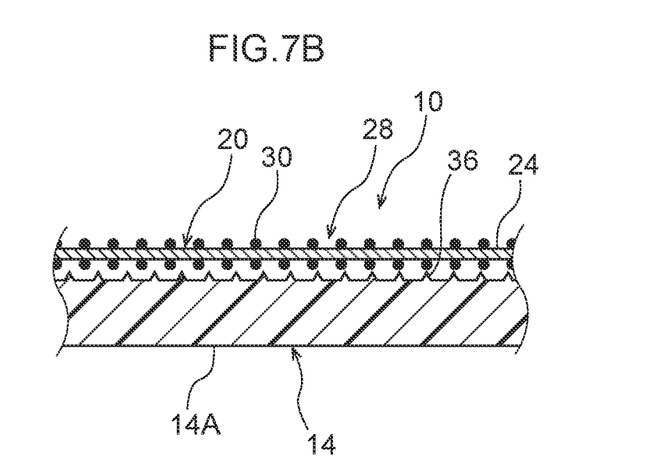
FIG. 7B is an enlarged cross-sectional view across a line Y-Y in FIG. 6A shown together with a front passenger seat airbag.

Furthermore, as is shown in FIG. 6A and FIG. 7B, it is also possible to form embossing 36 that has regularity in the vehicle front-rear direction in an area 14A on the outer surface of the instrument panel 14 that is contacted by the second area 28. Here, the term 'embossing 36 having regularity in the vehicle front-rear direction' refers to embossing 36 whose embossing grain flows in the vehicle front-rear direction, and whose coefficient of friction is greater in the vehicle width direction than in the vehicle front-rear direction.

According to this structure, even if the lower surface 20D of the front passenger seat airbag 20 attempts to move in the vehicle width direction, the stitches 30 formed in the second area 28 and the embossing 36 formed on the instrument panel 14 mutually impede each other's movement in the vehicle width direction, so that any movement in the vehicle width direction of the front passenger seat airbag 20 is inhibited. Accordingly, it is possible to further reduce oscillation in the vehicle width direction of the inflated and deployed front passenger seat airbag 20.

Figure 6B:
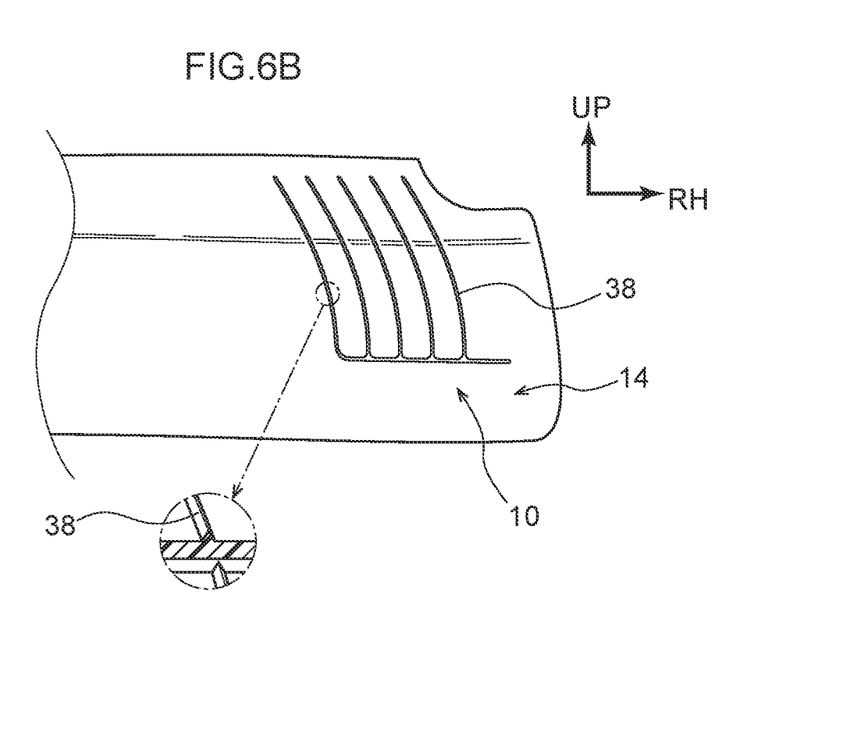
FIG. 6B is a perspective view showing character lines formed on an instrument panel.

Additionally, as is shown in FIG. 6B, it is also possible to form character lines 38 whose longitudinal direction extends in the vehicle front-rear direction in at least a portion of the area 14A (see FIG. 6A) on the outer surface of the instrument panel 14 that is contacted by the second area 28. The character lines 38 have, for example, a linear configuration and protrude towards the vehicle cabin side, and a plurality of (for example, five) character lines 38 may be formed at equal intervals from each other in the vehicle width direction.

According to this structure, even if the lower surface 20D of the front passenger seat airbag 20 attempts to move in the vehicle width direction, the stitches 30 formed in the second area 28 and the character lines 38 formed on the instrument panel 14 mutually impede each other's movement in the vehicle width direction, so that any movement in the vehicle width direction of the front passenger seat airbag 20 is inhibited. Accordingly, it is possible to further reduce oscillation in the vehicle width direction of the inflated and deployed front passenger seat airbag 20.

The oscillation reducing structure 10 for the front passenger seat airbag 20 according to the present exemplary embodiment has been described above based on the drawings, however, the oscillation reducing structure 10 for the front passenger seat airbag 20 according to the present exemplary embodiment is not limited to above-described structure and suitable design modifications and the like may be made thereto insofar as they do not depart from the spirit or scope of the present disclosure. For example, the character lines 38 may also be formed having a linear configuration which is hollowed out from the vehicle cabin side. In addition, it is also possible for both the embossing 36 and the character lines 38 to be formed in the area 14A on the outer surface of the instrument panel 14.

Furthermore, the area where the coefficient of friction is raised using a friction imparting device is not limited to both the first area 26 and the second area 28, and it is also possible for only one of the first area 26 or the second area 28 to be used exclusively. In other words, it is also possible to employ a structure in which the coefficient of friction of at least one of the first area 26 and the second area 28 is greater than the coefficient of friction of other areas (for example, the side surface 20S) of the front passenger seat airbag 20, and in which the coefficient of friction in the vehicle width direction is greater than in the vehicle front-rear direction.

Moreover, the friction imparting device provided in the first area 26 and the second area 28 is not restricted to being formed by the plurality of stitches 30 that are formed in a matrix configuration, and by the sewn lines 32 of a plurality of the stitches 30 that are sewn so as to extend in the vehicle front-rear direction. It is also possible for the friction imparting device provided in the first area 26 and the second area 28 to be formed, for example, by a plurality of silicon coatings (not shown in the drawings) that are coated in a matrix configuration or in a linear configuration running in the vehicle front-rear direction.

What is claimed is:

1. An oscillation reducing structure for a front passenger seat airbag comprising:
   a front passenger seat airbag that is equipped with a center bag, is provided in an instrument panel, and is inflated and deployed when supplied with gas from an inflator; and
   a friction imparting device that makes at least one of a coefficient of friction of a first area of the inflated and deployed front passenger seat airbag that comes into contact with a front windshield glass, or a coefficient of friction of a second area of the inflated and deployed front passenger seat airbag that comes into contact with an instrument panel, greater than a coefficient of friction of other areas of the front passenger seat airbag, wherein the friction imparting device is formed such that the coefficient of friction of the first area or the coefficient of friction of the second area in a vehicle width direction is greater than in a vehicle front-rear direction.

2. The oscillation reducing structure for a front passenger seat airbag according to claim 1, wherein the friction imparting device is created by forming a plurality of stitches that are sewn so as to extend in the vehicle front-rear direction in a plurality of rows in the vehicle width direction.

3. The oscillation reducing structure for a front passenger seat airbag according to claim 1, wherein the friction imparting device is formed by sewn lines of a plurality of stitches that are sewn so as to extend in the vehicle front-rear direction, in order to stitch together a plurality of airbag panels that are separated in the vehicle width direction.

4. The oscillation reducing structure for a front passenger seat airbag according to claim 1, wherein a pattern made up of a plurality of transparent dots whose longitudinal direction extends in the vehicle front-rear direction is provided in an area of the front windshield glass that is contacted by the first area.

5. The oscillation reducing structure for a front passenger seat airbag according to claim 1, wherein embossing that has regularity in the vehicle front-rear direction is formed in an area of the instrument panel that is contacted by the second area.

6. The oscillation reducing structure for a front passenger seat airbag according to claim 1, wherein character lines whose longitudinal direction extends in the vehicle front-rear direction are formed in an area of the instrument panel that is contacted by the second area.

7. The oscillation reducing structure for a front passenger seat airbag according to claim 1, wherein the friction imparting device is formed by a plurality of stitches that are sewn so as to extend in the vehicle front-rear direction and formed in a plurality of rows in the vehicle width direction in the first area, and by a sunshade pattern that is provided in an area of the front windshield glass that is opposite to the first area.

8. The oscillation reducing structure for a front passenger seat airbag according to claim 1, wherein the friction imparting device is formed by sewn lines of a plurality of stitches that are sewn so as to extend in the vehicle front-rear direction in order to stitch together a plurality of airbag panels that are separated in the vehicle width direction in the first area, and by a sunshade pattern that is provided in an area of the front windshield glass that is opposite to the first area.

9. The oscillation reducing structure for a front passenger seat airbag according to claim 1, wherein the coefficient of friction of the first area of the inflated and deployed front passenger seat airbag that comes into contact with the front windshield glass, and the coefficient of friction of the second area of the inflated and deployed front passenger seat airbag that comes into contact with the instrument panel is greater than the coefficient of friction of other areas of the front passenger seat airbag.

10. The oscillation reducing structure for a front passenger seat airbag according to claim 9, wherein the friction imparting device is formed such that the coefficient of friction of the first area and the coefficient of friction of the second area in a vehicle width direction is greater than in a vehicle front-rear direction.

11. The oscillation reducing structure for a front passenger seat airbag according to claim 1, wherein the friction imparting device is formed such that the coefficient of friction of the first area and the coefficient of friction of the second area in a vehicle width direction is greater than in a vehicle front-rear direction.

* * * * *